(12) United States Patent
Brinkmann et al.

(10) Patent No.: US 7,645,196 B2
(45) Date of Patent: Jan. 12, 2010

(54) APPARATUS FOR TRANSMITTING A TORQUE FROM A MOTOR TO A COMPRESSOR

(75) Inventors: Peter Brinkmann, Dortmund (DE); Michael Schutte, Iserlohn (DE); Frank Bayerl, Hagen-Dahl (DE)

(73) Assignees: Bakelite AG, Iserlohn-Letmathe (DE); Plastech Engineering GmbH, Iserlohn (DE)

( * ) Notice: Subject to any disclaimer, the term of this patent is extended or adjusted under 35 U.S.C. 154(b) by 76 days.

(21) Appl. No.: 11/037,094

(22) Filed: Jan. 18, 2005

(65) Prior Publication Data
US 2005/0192102 A1 Sep. 1, 2005

(30) Foreign Application Priority Data
Jan. 18, 2004 (DE) .................. 10 2004 002 668

(51) Int. Cl.
*F16D 9/06* (2006.01)
(52) U.S. Cl. ......................... 464/32; 474/902
(58) Field of Classification Search .................. 464/32, 464/33, 37; 474/70, 902; 417/319
See application file for complete search history.

(56) References Cited

U.S. PATENT DOCUMENTS

| | | | |
|---|---|---|---|
| 2,438,676 A * | 3/1948 | Nickle et al. .................. 464/33 |
| 2,514,228 A * | 7/1950 | Dodge ....................... 464/37 X |
| 2,692,486 A * | 10/1954 | Anderson ..................... 464/37 |
| 5,443,372 A | 8/1995 | Kanoll |
| 6,332,842 B1 | 12/2001 | Tabuchi et al. |
| 6,688,986 B2 * | 2/2004 | Hojyo et al. ............... 464/37 X |
| 2003/0104890 A1* | 6/2003 | Ochiai |
| 2003/0118443 A1 | 6/2003 | Chen |

FOREIGN PATENT DOCUMENTS

| | | |
|---|---|---|
| DE | 7725998 | 2/1979 |
| DE | 198 60 150 A1 | 7/2000 |
| EP | 0 856 675 | 8/1998 |

* cited by examiner

*Primary Examiner*—Greg Binda
(74) *Attorney, Agent, or Firm*—Charles A. Muserlian

(57) ABSTRACT

An apparatus for transmitting torque from a motor to a compressor comprises a hub connecting with a compressor shaft and a pulley rotatably supported on the compressor housing, the pulley and the hub connected with one another by a device for vibration clamping and for load limiting and the load limiting is implemented so that the connection between the pulley and hub is discontinued if a specific torque is exceeded. The load limiting device comprises a catch and a limiter ring (b) comprised of metal including pegs directed radially to the center and, through radial form fitting with hub, transmits the torque onto the compressor shaft and catch is made of a synthetic material encasing the limiter ring and catch and limiter ring can be axially displaced on hub and the limiter ring is preferable made of sintered metal.

13 Claims, 7 Drawing Sheets

APPARATUS FOR TRANSMITTING A TORQUE FROM A MOTOR TO A COMPRESSOR

An arrangement for transmitting a torque from a motor to a compressor for an air-conditioning system with a hub for the connection with the compressor shaft and a pulley rotatably supported on the compressor housing, in which the pulley and the hub are connected with one another via a device for damping vibrations and for load limiting, the load-limiting device being implemented such that the connection between pulley and hub is discontinued if a specified torque is exceeded.

BACKGROUND OF THE INVENTION

As a rule, compressors for air-conditioning systems are driven via a multi-V belt by the crank shaft of a combustion engine. When the compressor is blocked, the belt slips through and, as a rule, is destroyed. Thereby, the other power train elements in the same belt drive are no longer driven. In the most unfavorable case, the steering booster fails. To counteract this condition, at least one of the torque-transmitting elements must include a predetermined break-off function, which under unusual operational torque nullifies the connection between pulley and compressor shaft. The pulley subsequently provides for a continued functional belt drive without the driving compressor.

DE 198 60 150 A1 describes inter alia an arrangement in which a catch of a synthetic material is fixedly connected with a hub. One disadvantage is that the predetermined break-off function is provided exclusively by the connection between synthetic material and hub and therefore is highly temperature dependent. Furthermore, the state of ageing of the synthetic material also affects the breaking of the predetermined break-off locus, such that by all accounts, the predetermined break-off function is subject to wide statistical scattering.

OBJECTS OF THE INVENTION

It is an object of the invention to provide an apparatus for transmitting a torque from a motor to a compressor in an air-conditioning system whereby a predetermined break-off function operates with a minimal statistical scattering.

This and other objects and advantages of the invention will become obvious from the following detailed description.

SUMMARY OF THE INVENTION

An apparatus for transmitting torque from a motor to a compressor comprises a hub (7) connecting with a compressor shaft and a pulley (1) roratably supported on the compressor housing (4), the pulley (1) and the hub (7) connected with one another by a device for vibration clamping (9) and for load limiting and the load limiting is implemented so that the connection between the pulley (1) and hub (7) is discontinued if a specific torque is exceeded. The load limiting device comprises a catch (5) and a limiter ring (6) comprised of metal including pegs (6a) of the limiter ring directed radially to the center and, said limiter ring through radial form fitting with hub (7), transmits the torque onto the compressor shaft and catch (5) is made of a synthetic material encasing the limiter ring (6) and catch 5 and limiter ring (6) can be axially displaced on hub (7). The limiter ring (6) is preferably made of sintered metal.

In the arrangement of the invention, the predetermined break-off function is defined by the limiter ring alone, and effects with respect to temperature and ageing are irrelevant. The predetermined break-off function can be implemented such that it breaks independently of the direction of rotation, which makes the arrangement of the invention also suitable for compressors with different direction of rotation. But it can also be laid out for a preferred direction. Since the catch, limiter ring and hub are separate structural parts, the adaptation of the entire arrangement for different compressors is readily brought about by changing the inner geometries of the hubs.

In the invention, the pegs are defined as the form undercuts of various geometric forms projecting beyond the inner diameter of the limiter ring which lead to the radial transmission of the torque. By using synthetic material or plastic for the catch, it is feasible to provide a structural part of low weight and the catch is used as a separate synthetic disk or is also generated by encasing (extrusion coating) the limiter ring.

It is especially preferred that the synthetic material be a phenol formaldehyde resin. Since, due to the properties of phenol formaldehyde resins, the pulleys are also fabricated of them, an especially good accuracy of fit over the entire temperature range of the structure is attained, since there is no difference of expansions of the structural parts occurring. One advantage is attained if the limiter ring includes profiling at the outer edge side to ensure adequate form fit with the encasing synthetic material.

Through an arrangement in which the device for load limiting is formed by one structural part, namely a catch disk of metal, the catch disk comprising pegs directed radially and, through radial form fit with the hub, the torque to the compressor shaft and the catch disk can be axially displaced on the hub. This arrangement has a cost advantage, since only one structural part needs to be produced and installed. In the case of catch disks, it is also desirable to utilize parts with greater mass or higher mass moment of inertia, since this can lead to reductions of the rotational vibrations of the compressor. Metal catch disks have approximately 10-fold mass moment of inertia in comparison to a structurally identical part made of synthetic material.

It is especially advantageous if the pegs of the limiter ring or of the catch disk are tapered at their transition to the limiter ring or at their transition to the annular component, respectively. Through the tapering, this region is dimensioned for clearly the weakest locus so that an unambiguous break circle is defined. It is especially preferred if the hub includes axially extending grooves to receive the pegs. The axially extending outer grooves in the hub are laid out in their length so that the pegs of the limiter ring are movable on the hub in the axial direction, to be capable of readily compensating fabrication tolerances of the compressor, and thereby compensating position differences of the compressor shaft with respect to the housing.

Preferred, also, is the hub having a recess at the front side, which permits countersinking fastening elements, whereby the installation length of the entire arrangement can be markedly reduced.

One advantage, especially in comparison to catches available on the market, is furthermore if the device for load limiting and the hub are separate structural parts. Thereby, it becomes feasible to have the maximum outer diameter of the hub to be greater than the break circle of the limiter ring. By shearing off of the pegs of the limiter ring, it is reliably prevented that the catch disk as well as the limiter ring is hurled away from the arrangement, and it is also assured that, without elaborate additional measures, the hurling away of the broken off parts of the catch is prevented.

It is preferred to have a spring element disposed between hub and limiter ring or catch disk. To counteract potential noise formation between the hub and the limiter ring, a resilient element can be disposed to form a prestressing. The material of which the hub is fabricated is preferably a synthetic material, due to the lower weight entailed therein. It is furthermore feasible for the hub to be comprised of aluminum, of sintered metal or of brass.

DETAILED DESCRIPTION OF THE INVENTION

Figure 1B:
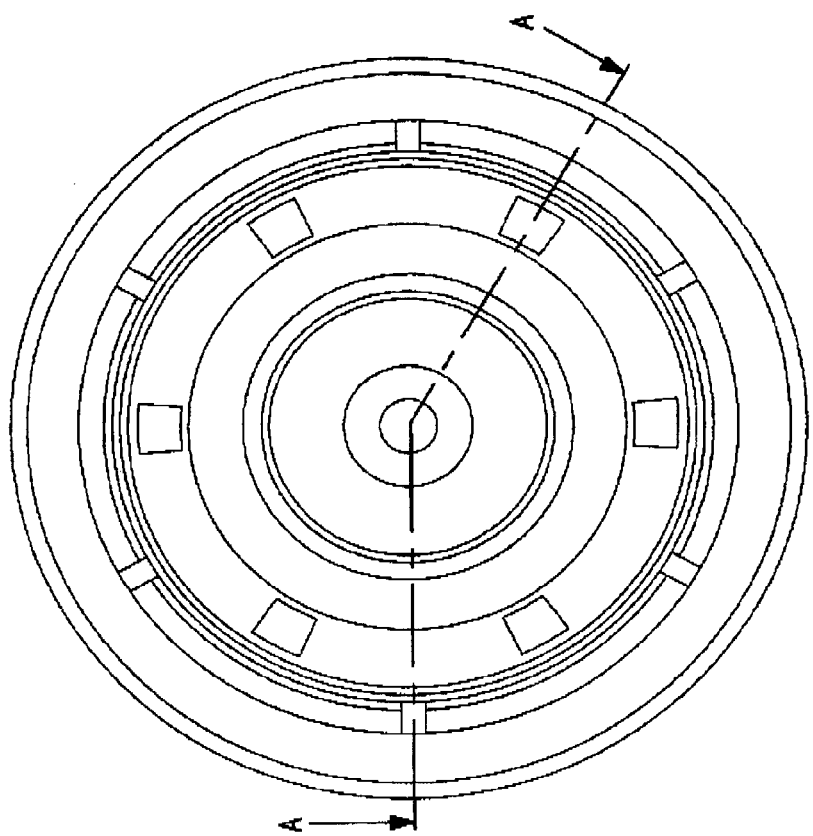
FIG. 1 is a section along line A-A through an arrangement of the invention
Figure 1A:
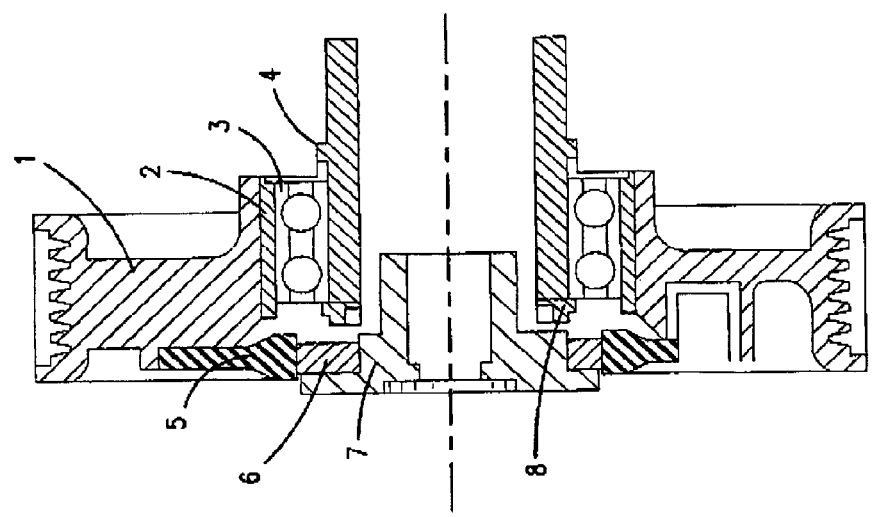

FIG. 1 shows a pulley 1 which drives a not shown shaft of a compressor with a compressor housing 4, bearing 3, steel ring 2. Between the pulley 1 and the hub 7, is located a device for vibration damping and load limiting with the depicted structural parts catch 5 and limiter ring 6.

Figure 2:
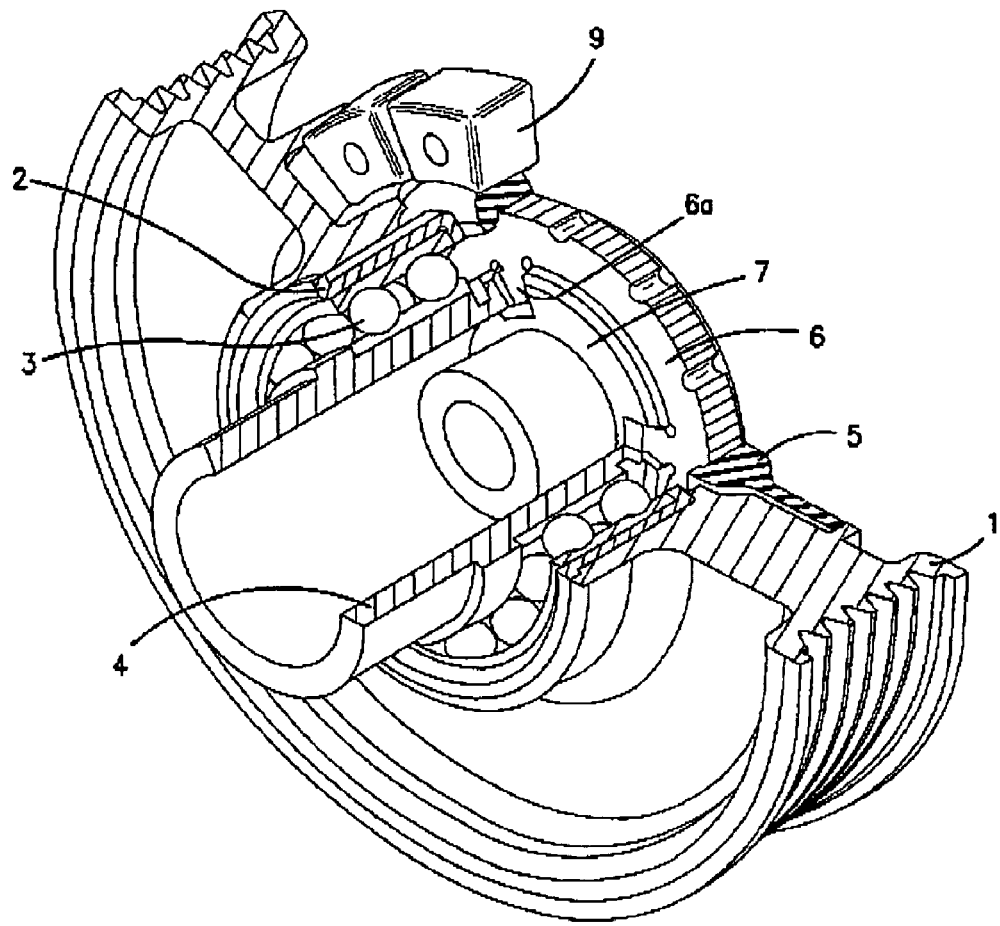
FIG. 2 is a section through the arrangement of the invention in three dimensions
Figure 3:
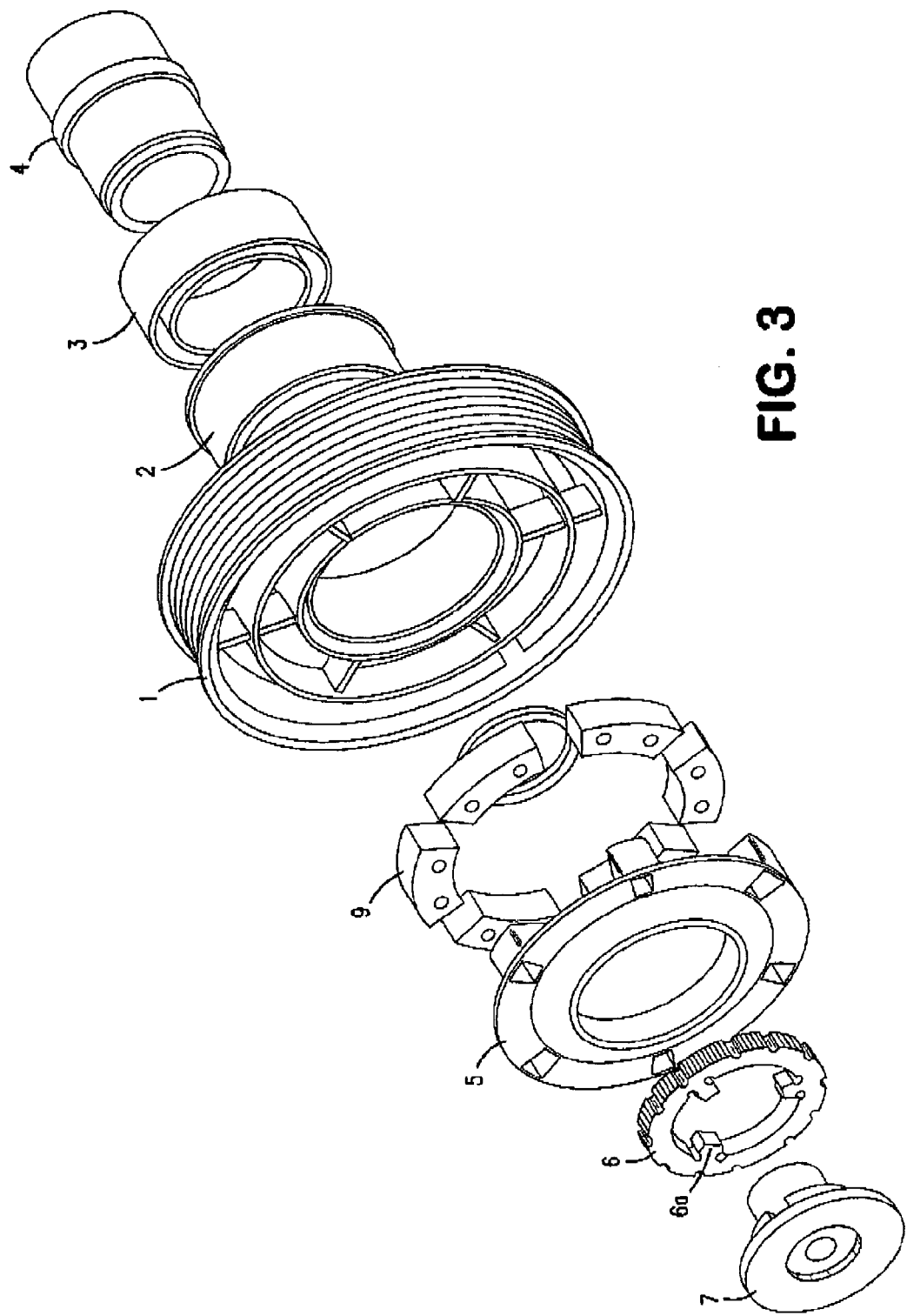
FIG. 3 is an exploded view of the arrangement of the invention from the front

FIGS. 2 and 3 show further that the limiter ring 6 comprises pegs, disposed radially toward the center which engage axially extending grooves of hub 7. The axially extending outer grooves in the hub 7 are laid out in their length such that the pegs 6a of the limiter ring 6 is movable in the axial direction on the hub 7. The hub (7) may be comprised of synthetic material, aluminum, brass or sintered metal. At the outer edge side, the limiter ring 6 is encompassed by the catch 5 which projects through a radially segmented profiling into the pulley 1. The pulley 1, due to webbing, has the same number of recesses as the catch 5 has elevated segments. Between pulley 1 and catch 5 is disposed the device for vibration damping with its elastic elements 9, which ensures the damping of rotational vibrations between the pulley 1 and the not shown compressor shaft.

Figure 4:
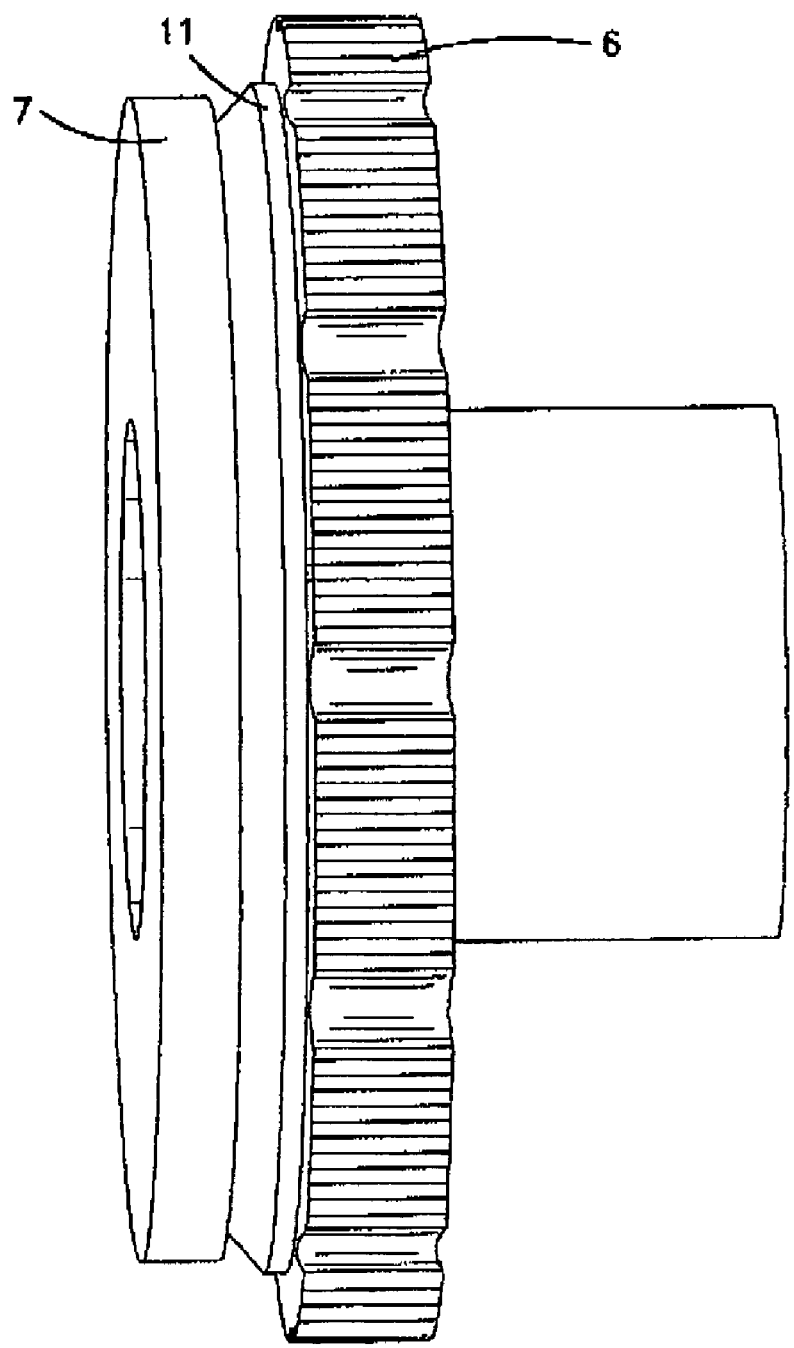
FIG. 4 is a three-dimensional illustration of the disposition of a spring element
Figure 5:
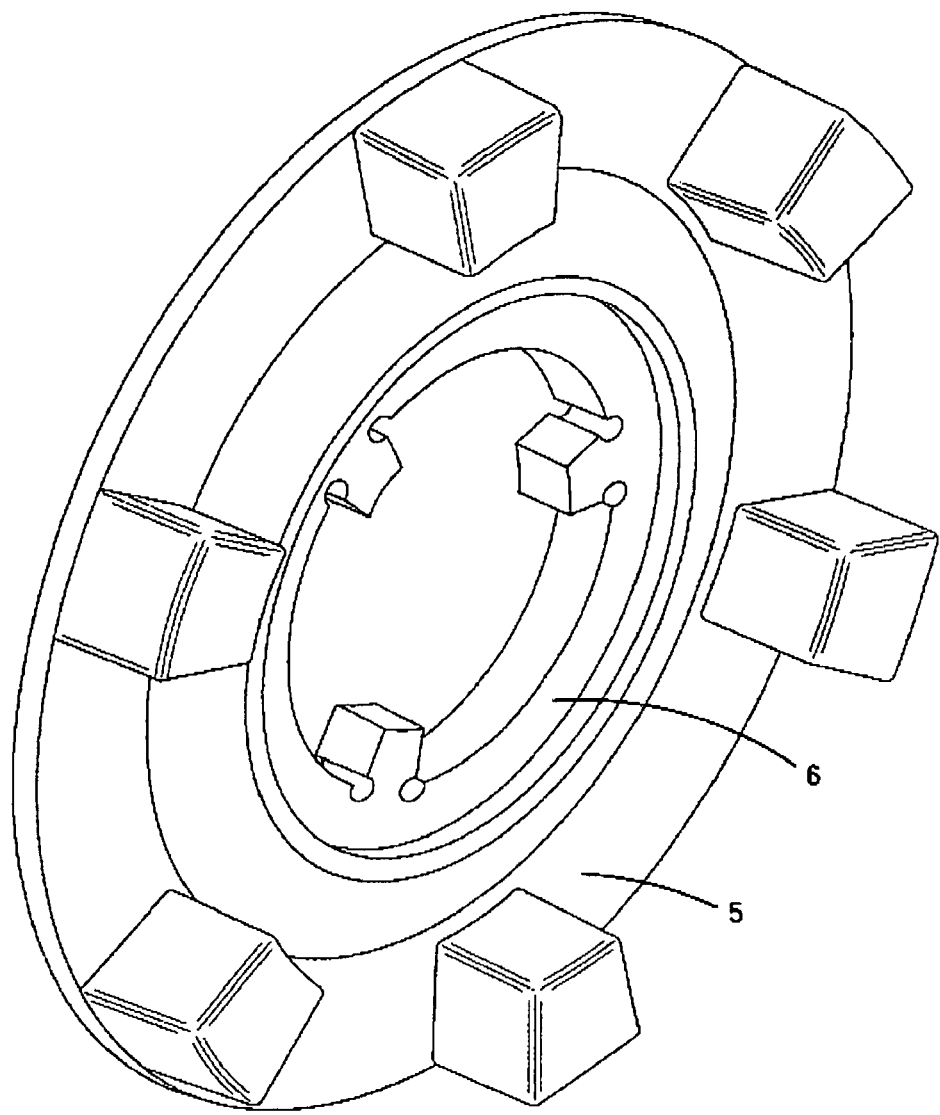
FIG. 5 is a three-dimensional view of a two-part catch with limiter ring from behind

FIG. 4 shows the disposition of a resilient element 11 between limiter ring 6 and hub 7. In FIG. 5, the catch 5 and the limiter ring 6 are shown as separate structural parts. For the formation of the catch 5, the limiter ring 6 is shown encased in phenol formaldehyde resin.

Figure 6:
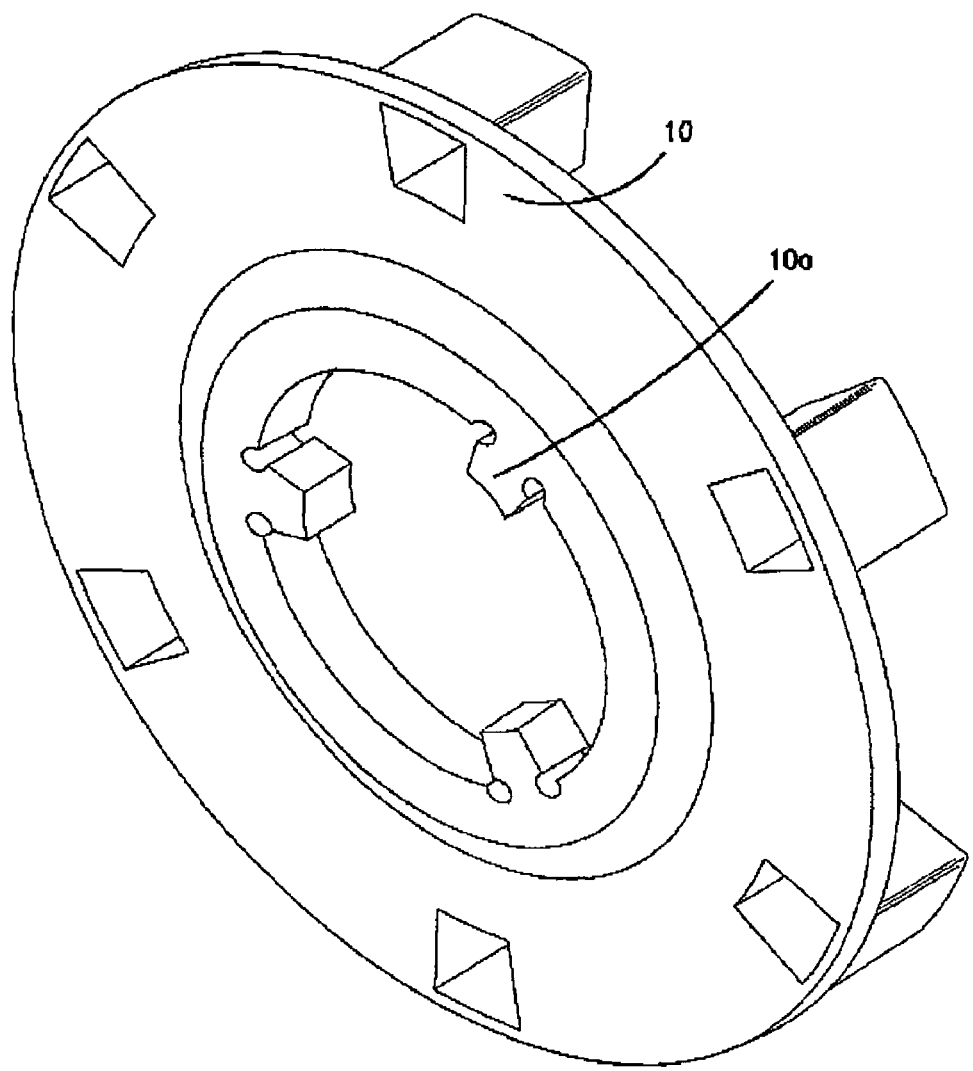
FIG. 6 is a three-dimensional view of a single-piece catch from the front
Figure 7:
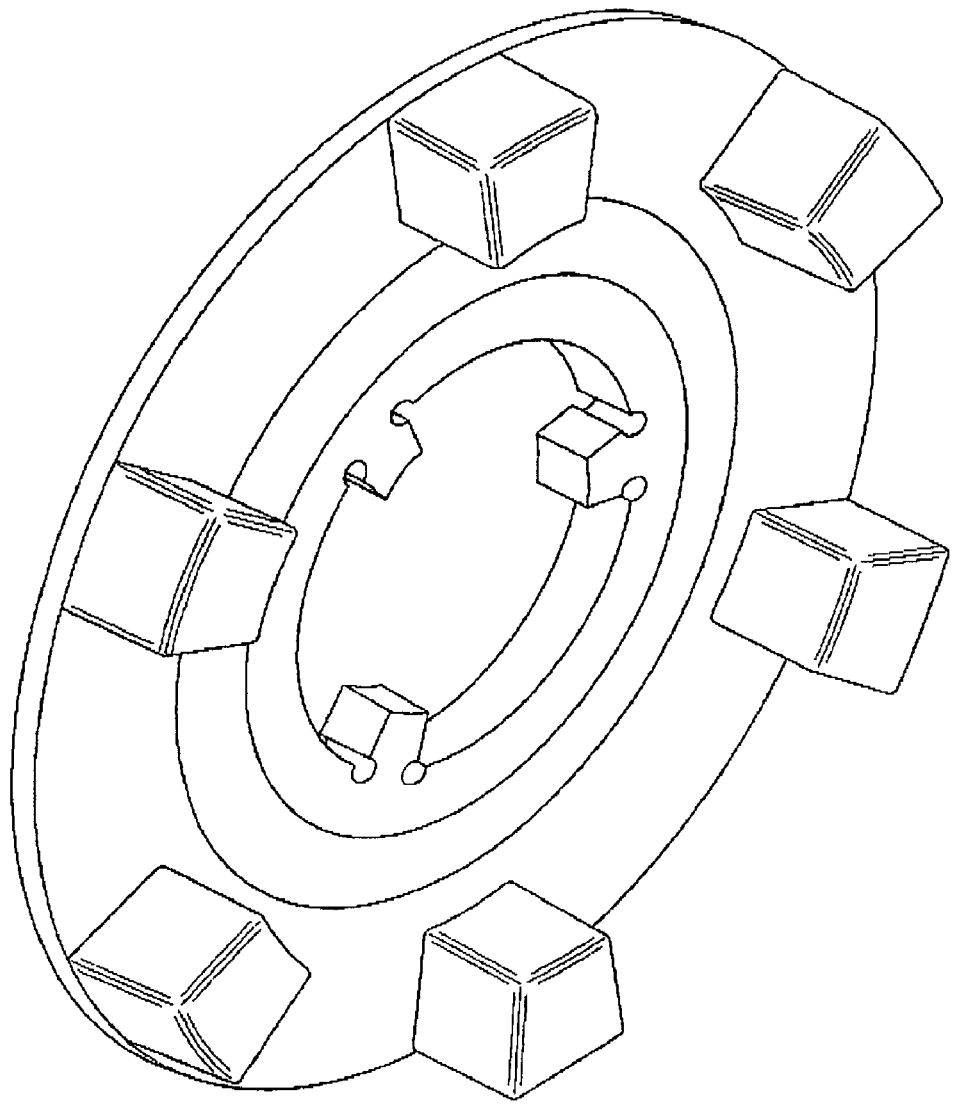
FIG. 7 is a three-dimensional view of a single-piece catch from behind

FIGS. 6 and 7 show the structural part for the load-limiting device in the form of a single-piece catch disk 10, the catch disk 10 comprising pegs 10a disposed radially toward the center, which pegs engage axially extending grooves of hub 7.

Various modifications of the apparatus of invention may be made without departing from the scope thereof. It is to be understood that the invention is intended to be limited only as defined in the appended claims.

What we claim is:

1. An apparatus for transmitting torque from a motor to a compressor comprising
   a hub (7) connecting with a compressor shaft and a pulley (1) rotatably supported on a compressor housing (4),
   the pulley (1) and the hub (7) connected with one another by a device for vibration clamping (9) and by a device for loading limiting,
   the load limiting device is implemented so that the connection between the pulley (1) and hub (7) is discontinued if a specific torque is exceeded,
   the load limiting device comprising a catch (5) and a limiter ring (6) comprised of metal including pegs (6a) directed radially to the center which shear off to ensure the predetermined break off function is defined by the ring (6) alone,
   and, said limiter ring (6) through radial form fitting with hub (7), transmits the torque onto the compressor shaft, catch (5) is made of a synthetic material encasing the limiter ring (6) whereby catch (5) and limiter ring (6) can be axially displaced on hub (7).

2. The apparatus of claim 1, wherein the synthetic material is phenol formaldehyde resin.

3. The apparatus of claim 1 wherein the limiter ring (6) includes a profiling on an outer edge side.

4. An apparatus of claim 1 wherein the pegs (6a) of the limiter ring at their transition to the limiter ring (6) are tapered.

5. An apparatus of claim 1 wherein the hub (7) comprises an axially extending groove to receive the pegs (6a, 10a).

6. An apparatus of claim 1 wherein the hub (7) has recesses at the front side which permit fastening elements to be countersunk.

7. An apparatus of claim 1 wherein the device for load limiting and the hub (7) are separate structural parts.

8. An apparatus of claim 1 wherein a spring element (11) is disposed between hub (7) and limiter ring (6).

9. An apparatus of claim 1 wherein the hub (7) is comprised of synthetic material.

10. An apparatus of claim 1 wherein the hub (7) is comprised of aluminum.

11. An apparatus of claim 1 wherein the hub (7) is sintered metal.

12. An apparatus of claim 1 wherein the hub (7) is made of brass.

13. An apparatus of claim 1 wherein the pegs (6a) of the limiter ring comprise a region of weakest locus so that an unambiguous break region is defined.

* * * * *